United States Patent
Srichai et al.

(10) Patent No.: US 12,403,748 B2
(45) Date of Patent: Sep. 2, 2025

(54) METHOD AND SYSTEM OF PROVIDING VARIABLE SOUND CONTROL OF A TRANSPORT CLIMATE CONTROL SYSTEM

(71) Applicant: THERMO KING LLC, Minneapolis, MN (US)

(72) Inventors: Panayu Robert Srichai, Minneapolis, MN (US); Michael James Vanous, Minneapolis, MN (US); Adam Leonard Clark, Minneapolis, MN (US); Ferdy Martinus, Edina, MN (US); Scott R Bates, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 197 days.

(21) Appl. No.: 18/311,590

(22) Filed: May 3, 2023

(65) Prior Publication Data
US 2023/0356561 A1    Nov. 9, 2023

Related U.S. Application Data

(60) Provisional application No. 63/338,981, filed on May 6, 2022.

(51) Int. Cl.
*B60H 1/00*    (2006.01)
*B60H 1/32*    (2006.01)

(52) U.S. Cl.
CPC ....... *B60H 1/00757* (2013.01); *B60H 1/3205* (2013.01)

(58) Field of Classification Search
CPC .............. B60H 1/00757; B60H 1/3205; B60H 1/00764; B60H 1/3232; B60H 2001/006; B60P 3/20
See application file for complete search history.

(56) References Cited

U.S. PATENT DOCUMENTS

| 10,214,219 B2 | 2/2019 | Richards et al. |
| 10,300,766 B2 | 5/2019 | Vehr et al. |

(Continued)

FOREIGN PATENT DOCUMENTS

| CN | 114103595 | | 3/2022 | |
| CN | 114103595 A | * | 3/2022 | ......... B60H 1/00392 |

(Continued)

OTHER PUBLICATIONS

Extended European Search Report, issued in the corresponding European patent application No. 23170813.2, dated Sep. 25, 2023, 8 pages.

*Primary Examiner* — Emmanuel E Duke
(74) *Attorney, Agent, or Firm* — HSML P.C.

(57) ABSTRACT

Methods and systems for controlling noise generated by a transport climate control system (TCCS) that provides climate control within a climate controlled space of a transport unit are disclosed. The methods and systems include a controller obtaining a noise tolerance, wherein the noise tolerance is a threshold noise level that includes at least a noise level generated by the TCCS; the controller monitoring the noise level generated by the TCCS; the controller comparing the noise tolerance with the noise level generated by the TCCS; upon the controller determining that the noise level generated by the TCCS is greater than the noise tolerance, the controller determining a target operating condition of the TCCS for matching the noise level generated by the TCCS with the noise tolerance; and the controller adjusting the TCCS to the target operating condition to adjust the noise level generated by the TCCS.

15 Claims, 5 Drawing Sheets

(56) References Cited

U.S. PATENT DOCUMENTS

| | | | |
|---|---|---|---|
| 10,353,410 B2 | 7/2019 | Bates et al. | |
| 2015/0224848 A1* | 8/2015 | Eisenhour | B60H 1/0075 |
| | | | 62/186 |
| 2015/0314670 A1* | 11/2015 | Lucht | F25B 49/025 |
| | | | 62/115 |
| 2021/0229530 A1* | 7/2021 | Renault | B60P 3/00 |

FOREIGN PATENT DOCUMENTS

| | | | | |
|---|---|---|---|---|
| CN | 115727473 A * | 3/2023 | | |
| EP | 2743110 | 6/2014 | | |
| EP | 2743110 A1 * | 6/2014 | | B60H 1/00771 |
| JP | 2011237856 A * | 11/2011 | | |
| JP | 6948329 B2 * | 10/2021 | | E02F 1/00 |
| WO | WO-2021205621 A1 * | 10/2021 | | |

* cited by examiner

METHOD AND SYSTEM OF PROVIDING VARIABLE SOUND CONTROL OF A TRANSPORT CLIMATE CONTROL SYSTEM

FIELD

This disclosure relates generally to providing variable sound control of a transport climate control system (TCCS).

BACKGROUND

A transport climate control system (TCCS) can include, for example, a transport refrigeration system (TRS) and/or a heating, ventilation, and air conditioning (HVAC) system. A TRS is generally used to control an environmental condition (e.g., temperature, humidity, air quality, and the like) within a climate controlled space of a transport unit (TU). The TU can be, for example, a truck, a van, a container (such as a container on a flat car, an intermodal container, etc.), a box car, a semi-tractor, a mass-transit vehicle such as a passenger bus, or other similar transport units. The TRS can maintain environmental condition of the cargo space to maintain cargo (e.g., produce, frozen foods, pharmaceuticals, etc.). The transport unit can include a HVAC system to control an environmental condition within a passenger space of the vehicle.

SUMMARY

This disclosure relates generally to providing variable sound control of a transport climate control system (TCCS).

In particular, methods and systems are provided to allow a user to adjust an amount of sound generated by a TCCS. This allows a user to limit noise coming generated by the TCCS including a climate control unit (CCU) of the TCCS. In some embodiments, the user can define a maximum noise the CCU of the TCCS can output. The embodiments described herein can then, for example, limit the maximum speed of one or more condenser fans/blowers, one or more evaporator fans/blowers, a compressor, etc. through the use of a controller stored dynamic model that can predict a sound generated by the TCCS based on various parameters (e.g., temperature within a climate controlled space, an ambient temperature outside of the transport unit, a condenser fan(s)/blower(s) speed, an evaporator fan(s)/blower(s) speed, a compressor speed, etc.). In some embodiments the user can input a sound setting via a human-machine interface (HMI) of the TCCS.

In some embodiments, the methods and systems provided herein can adjust the noise generated by the TCCS to track, or be marginally lower than, the varying noise level occurring from ambient conditions (e.g., wind, rain, etc.) and other components on the climate controlled transport unit having the TCCS (e.g., an electric chassis, a vehicle engine, etc.). Accordingly, even if the capacity of the TCCS is increased thereby causing the noise generated by the TCCS to be greater than the user desired noise tolerance, the increased noise generated by the TCCS can be masked or not perceptible to the user based on the noise level occurring from ambient conditions and other components of the climate controlled transport unit. Thus, the actual and/or the perception of TCCS noise can be reduced, thereby reducing the distraction and/or annoyance to the user, for example, driving a vehicle that is towing or is part of the climate controlled transport unit. Meanwhile, allowing the TCCS to generate a noise level above the noise tolerance when noise occurring from ambient conditions and other components of the transport climate controlled transport unit has already exceeded the noise tolerance, the TCCS can provide additional climate control capacity while introducing a limited amount of additional noise perceived by the user. Accordingly, by controlling TCCS to track or stay marginally lower than the noise occurring from ambient conditions and other components of the transport climate controlled unit, user experience and comfort with the noise of the climate controlled transport unit can be improved.

A transport unit with a combustion engine and/or on board generators can generate a baseline noise level. When the baseline noise level generated by the combustion engine is high, the TCCS noise generated by the TCCS may be less noticeable to the operator. However, for electrically powered transport units (e.g., an electric truck), idling or low speed can produce little to no noise. The noise level produced by the TCCS can be higher than that of the electrically powered transport unit such that the TCCS noise can be more noticeable by the user. At higher traveling speeds, the transport unit can produce a higher noise level from road noise, wind, and/or the electrical chassis. Accordingly, at higher traveling speeds, the TCCS can produce a higher climate control capacity with a higher noise level that can be masked by the noise from the transport unit. Thus, by adjusting the operation of the TCCS in accordance with the noise level generated by the transport unit, the TCCS can generate less noise when the TCCS noise is more noticeable. When the TCCS noise is less noticeable, for example, due to a high noise level from the transport unit, the TCCS can produce more noise and higher climate control capacity without creating noise that is more distractive or annoying to the user.

In some embodiments, a method for controlling noise generated by a transport climate control system (TCCS) that provides climate control within a climate controlled space of a transport unit is disclosed. The method includes a controller obtaining a noise tolerance, wherein the noise tolerance is a threshold noise level that includes at least a noise level generated by the TCCS; the controller monitoring the noise level generated by the TCCS; the controller comparing the noise tolerance with the noise level generated by the TCCS; upon the controller determining that the noise level generated by the TCCS is greater than the noise tolerance, the controller determining a target operating condition of the TCCS for matching the noise level generated by the TCCS with the noise tolerance; and the controller adjusting the TCCS to the target operating condition to adjust the noise level generated by the TCCS.

In some embodiments, a transport climate control system (TCCS) for providing climate control within a climate controlled space of a transport unit is disclosed. The TCCS includes a climate control circuit configured to provide climate control within the climate controlled space; and a controller configured to control the climate control circuit. The controller is also configured to obtain a noise tolerance, wherein the noise tolerance is a threshold noise level that includes at least a noise level generated by the TCCS; monitor the noise level generated by the TCCS; compare the noise tolerance with the noise level generated by the TCCS; upon determining that the noise level generated by the TCCS is greater than the noise tolerance, determine a target operating condition of the TCCS for matching the noise level generated by the TCCS with the noise tolerance; and adjust the TCCS to the target operating condition to adjust the noise level generated by the TCCS.

BRIEF DESCRIPTION OF THE DRAWINGS

References are made to the accompanying drawings that form a part of this disclosure, and which illustrate embodi

Like reference numbers represent like parts throughout.

DETAILED DESCRIPTION

This disclosure relates generally to providing variable sound control of a transport climate control system (TCCS).

In particular, methods and systems are provided to allow a user to adjust an amount of sound (and/or other characteristics of sound, e.g., frequency, tone, or the like) generated by a TCCS. This allows a user to limit noise coming generated by the TCCS including a climate control unit (CCU) of the TCCS. In some embodiments, the user can define a maximum noise the CCU of the TCCS can output. The embodiments described herein can then, for example, limit the maximum speed of one or more condenser fans/blowers, one or more evaporator fans/blowers, a compressor, etc. through the use of a controller stored dynamic model that can predict a sound generated by the TCCS based on various parameters (e.g., temperature within a climate controlled space, an ambient temperature outside of the transport unit, a condenser fan(s)/blower(s) speed, an evaporator fan(s)/blower(s) speed, a compressor speed, etc.). In some embodiments the user can input a sound setting via a human-machine interface (HMI) of the TCCS.

In some embodiments, the methods and systems provided herein can adjust the noise generated by the TCCS to track, or be marginally lower than, the varying noise level occurring from ambient conditions (e.g., wind, rain, etc.) and other components on the climate controlled transport unit having the TCCS (e.g., an electric chassis, a vehicle engine, etc.). Accordingly, even if the capacity of the TCCS is increased thereby causing the noise generated by the TCCS to be greater than the user desired noise tolerance, the increased noise generated by the TCCS can be masked or not perceptible to the user based on the noise level occurring from ambient conditions and other components of the climate controlled transport unit. Thus, the actual and/or the perception of TCCS noise can be reduced, thereby reducing the distraction and/or annoyance to the user, for example, driving a vehicle that is towing or is part of the climate controlled transport unit. Meanwhile, allowing the TCCS to generate a noise level above the noise tolerance when noise occurring from ambient conditions and other components of the transport climate controlled transport unit has already exceeded the noise tolerance, the TCCS can provide additional climate control capacity while introducing a limited amount of additional noise perceived by the user. Accordingly, by controlling TCCS to track or stay marginally lower than the noise occurring from ambient conditions and other components of the transport climate controlled unit, user experience and comfort with the noise of the climate controlled transport unit can be improved.

A transport unit with a combustion engine and/or on board generators can generate a baseline noise level. When the baseline noise level generated by the combustion engine is high, the TCCS noise generated by the TCCS may be less noticeable to the operator. However, for electrically powered transport units (e.g., an electric truck), idling or low speed can produce little to no noise. The noise level produced by the TCCS can be higher than that of the electrically powered transport unit such that the TCCS noise can be more noticeable by the user. At higher traveling speeds, the transport unit can produce a higher noise level from road noise, wind, and/or the electrical chassis. Accordingly, at higher traveling speeds, the TCCS can produce a higher climate control capacity with a higher noise level that can be masked by the noise from the transport unit. Thus, by adjusting the operation of the TCCS in accordance with the noise level generated by the transport unit, the TCCS can generate less noise when the TCCS noise is more noticeable. When the TCCS noise is less noticeable, for example, due to a high noise level from the transport unit, the TCCS can produce more noise and higher climate control capacity without creating noise that is more distractive or annoying to the user.

A transport climate control system is generally used to control one or more environmental conditions such as, but not limited to, temperature, humidity, air quality, or combinations thereof, of a transport unit. Examples of transport units include, but are not limited to a truck, a van, a container (such as a container on a flat car, an intermodal container, etc.), a box car, a semi-tractor, a mass-transit vehicle such as a passenger bus, or other similar transport unit. A climate controlled transport unit can include a transport unit having a transport climate control system. Examples of a climate controlled transport unit can include a truck 100 having the TCCS 105, a van 130 having a TCCS 135, a climate controlled transport unit 200 having a TCCS 210, or a mass-transit vehicle 300 having a TCCS 305 of FIGS. 1A-1D.

A climate controlled transport unit can be used to transport perishable items such as pharmaceuticals, produce, frozen foods, and meat products and/or can be used to provide climate comfort for users in a passenger space of a mass-transit vehicle. The transport climate control system may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system can include, for example, a vapor compression refrigeration system, a cryogen based refrigeration system, a eutectic based refrigeration system, a heat plate refrigeration system, etc.

A transport climate control system can include a climate control unit (CCU) attached to a transport unit to control one or more environmental conditions (e.g., temperature, humidity, air quality, etc.) of a climate controlled space of the climate controlled transport unit. The CCU can include, without limitation, a climate control circuit (including, for example, a compressor, a condenser, an expander (e.g., expansion valve), and an evaporator), and one or more fans or blowers to control the heat exchange between the air within the climate controlled space and the ambient air outside of the climate controlled transport unit. As defined herein, an expander can be an expansion valve or any other type of expander that is configured to control an amount of working fluid passing there through and thereby regulate the superheat of vapor leaving an evaporator.

A climate controlled transport unit (e.g., a transport unit including a transport climate control system) can be used to transport human users or passengers, other animals, and/or perishable items such as, but not limited to, pharmaceuticals, biological samples produce, frozen foods, and meat products.

Figure 1A:
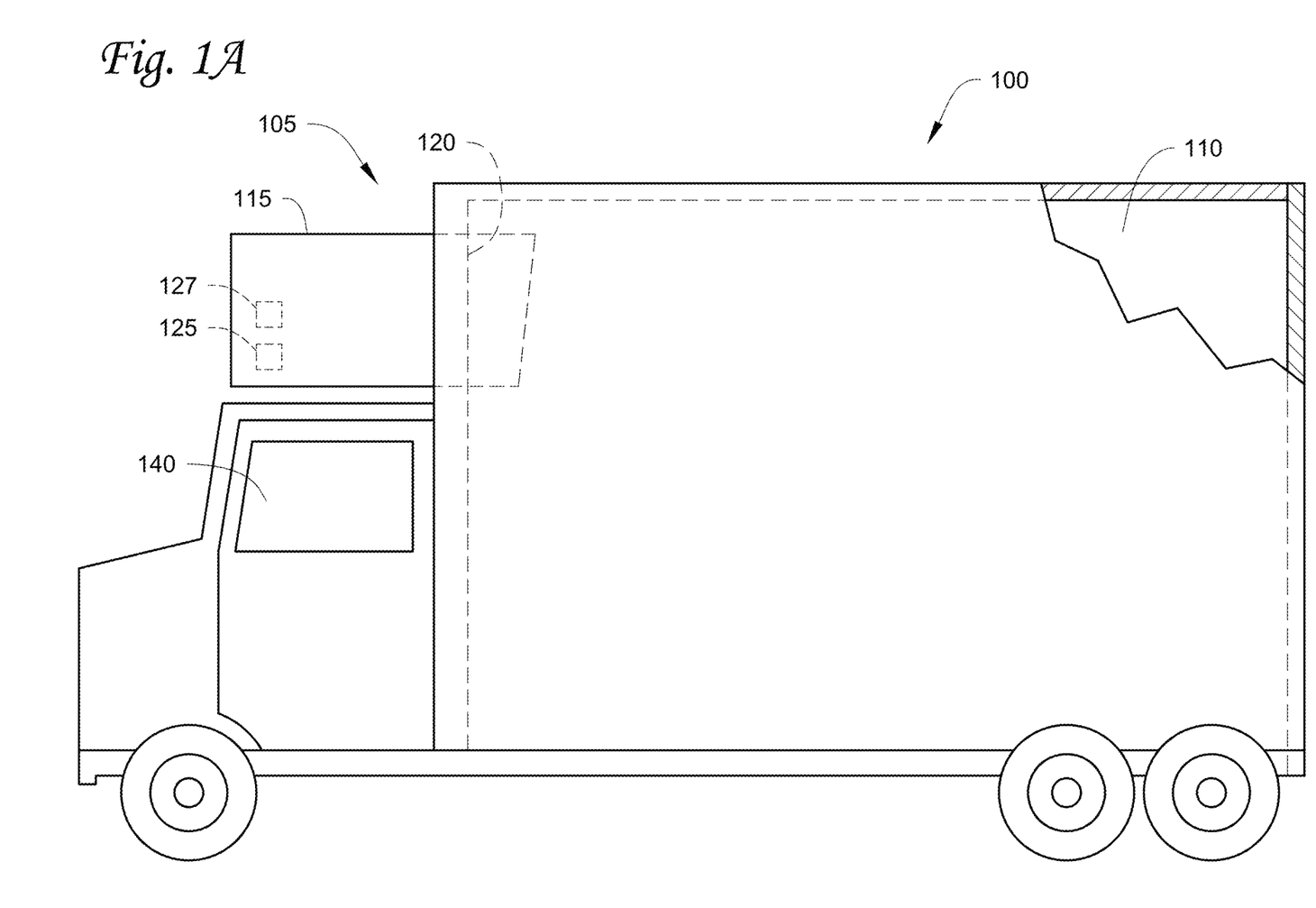
- FIG. 1A illustrates a side view of a truck with a transport climate control system, according to one embodiment.
Figure 1B:
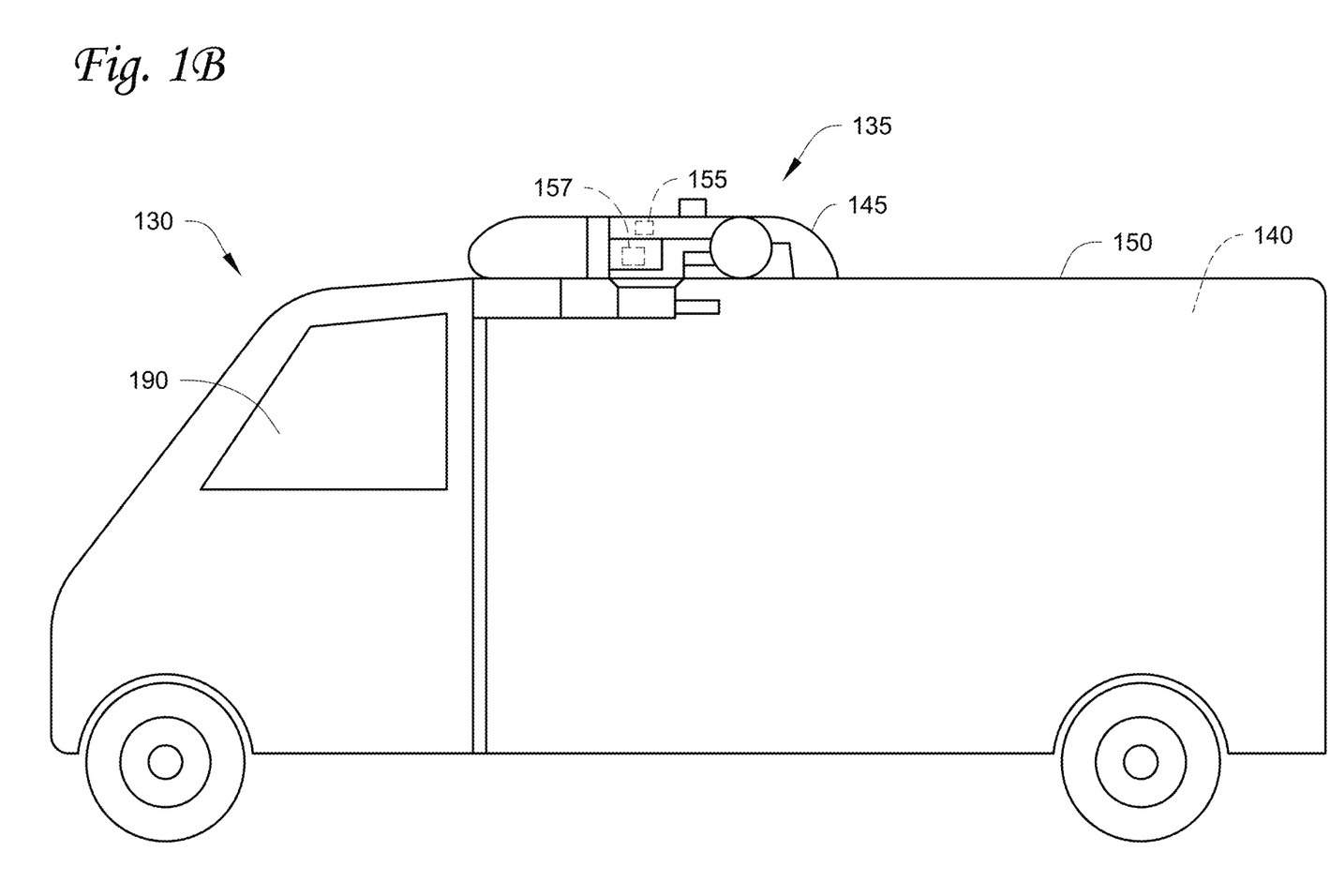
FIG. 1B illustrates a side view of a van with a transport climate control system, according to one embodiment.
Figure 1C:
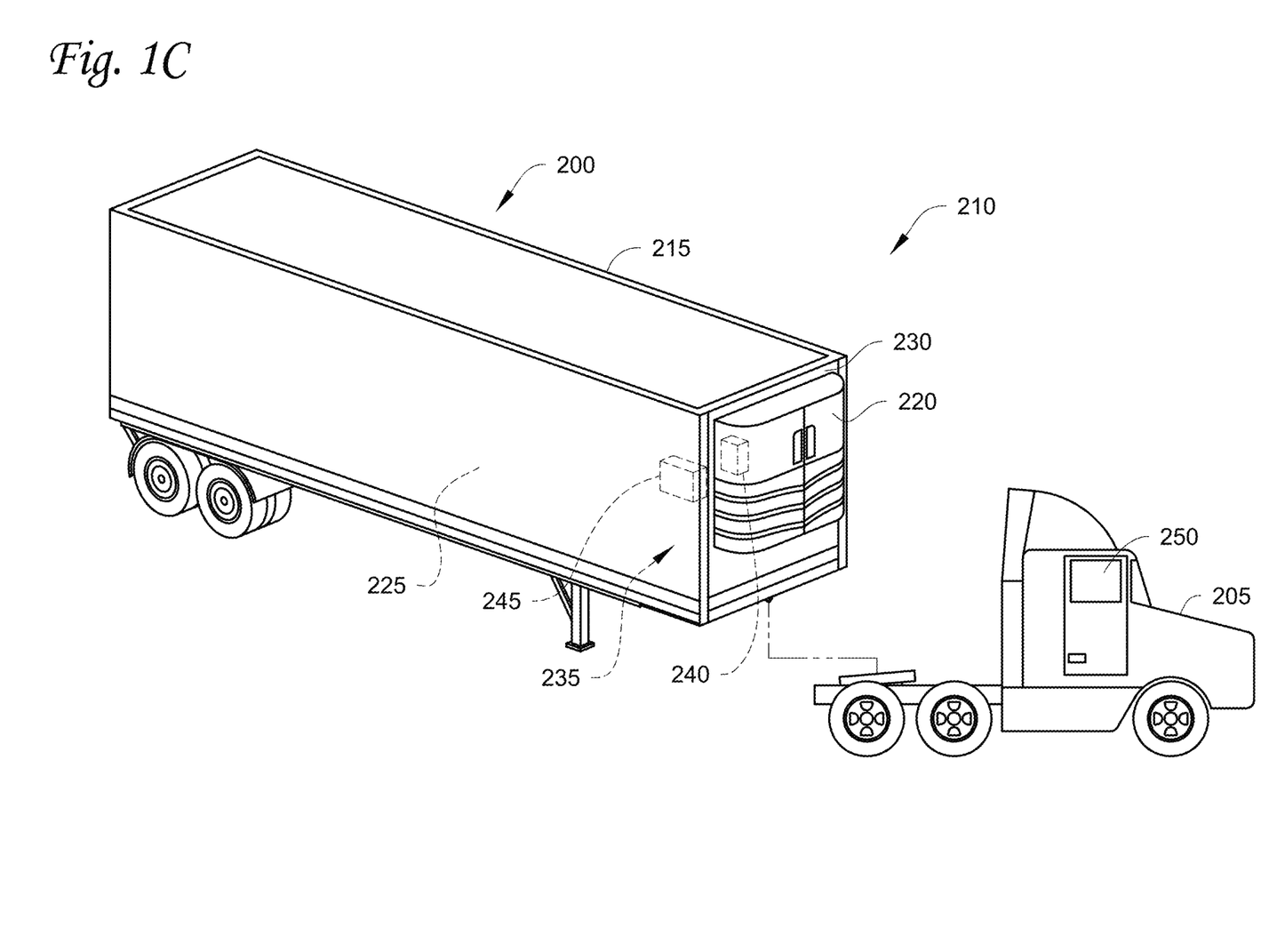
FIG. 1C illustrates a perspective view of a climate controlled transport unit with a transport climate control system attached to a tractor, according to one embodiment.
Figure 1D:
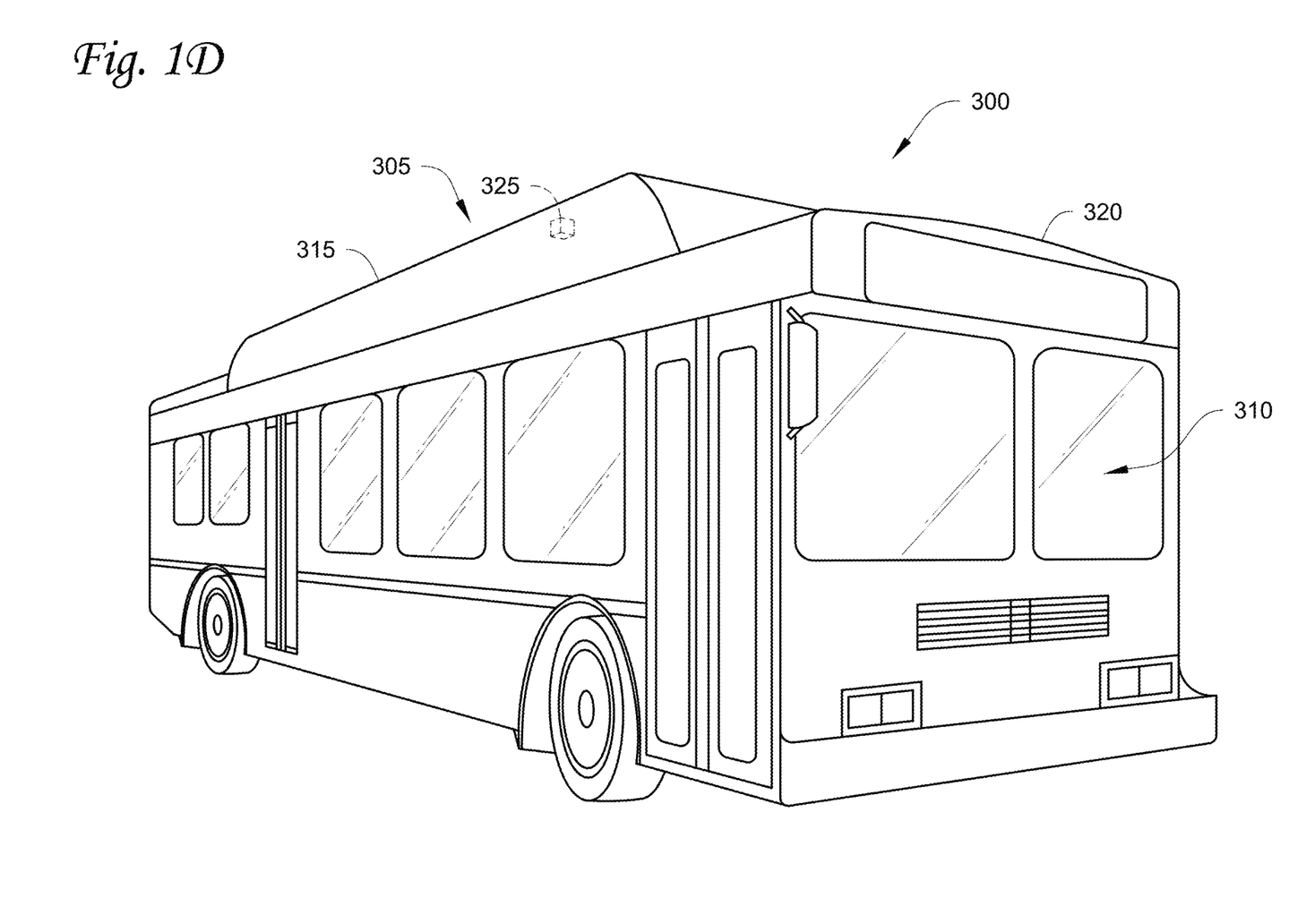
FIG. 1D illustrates a perspective view of a mass-transit vehicle including a transport climate control system, according to one embodiment.

FIGS. 1A-D show various embodiments of a transport climate control system. FIG. 1A is a side view of a truck 100 with a transport climate control system 105, according to an embodiment. FIG. 1B is a side view of a van 130 with a transport climate control system 135, according to an embodiment. FIG. 1C is a perspective view of a climate controlled transport unit 200 attachable to a tractor 205, according to an embodiment. The climate controlled transport unit 200 includes a transport climate control system 210. FIG. 1D is a perspective view of a climate controlled mass-transit vehicle 300 with a transport climate control system 305, according to an embodiment.

FIG. 1A depicts the truck 100 (e.g., a climate controlled straight truck) that includes the climate controlled space 110 for carrying cargo and the transport climate control system 105. The transport climate control system 105 can include, among other components, a climate control circuit that connects, for example, a compressor, a condenser, an evaporator, and an expander (e.g., an expansion valve or other expansion devices) to provide climate control within the climate controlled space 110.

The transport climate control system 105 includes a CCU 115 that is mounted to a front wall 120 of the climate controlled space 110. The CCU 115 can include, for example, the compressor, the condenser, the evaporator, and the expander. In an embodiment, the CCU 115 can be a transport refrigeration unit.

The transport climate control system 105 also includes a programmable climate controller 125 and one or more climate control sensors that are configured to measure one or more parameters of the transport climate control system 105 (e.g., an ambient temperature outside of the truck 100, an ambient humidity outside of the truck 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameter(s) (e.g., as climate control data) to the climate controller 125. The one or more climate control sensors can be positioned at various locations outside the truck 100 and/or inside the truck 100 (including within the climate controlled space 110). In some embodiments, the transport climate control system 105 can include a microphone to directly measure a noise level generated by the transport climate control system 105.

The climate controller 125 is configured to control operation of the transport climate control system 105 that may include a single integrated control unit 125 or may include a distributed network of climate controller elements 125, 127. The number of distributed control elements in a given network can depend upon the particular application of the principles described herein. The measured parameters obtained by the one or more climate control sensors can be used by the climate controller 125 to control operation of the transport climate control system 105. It is appreciated that the controller 125 can be configured to control one or more operating conditions (e.g., compressor speed, fan/blower speed, or the like) of the transport climate control system 105.

One or more users (e.g., a driver, operator, passenger, or the like) can stay in a passenger compartment 140. Noise generated by the transport climate control system 105 and/or the transport unit (e.g., truck 100) can be heard inside the passenger compartment 140 and affect user experience and comfort.

FIG. 1B depicts the van 130 having the transport climate control system 135 for providing climate control within a climate controlled space 140. The transport climate control system 135 includes a climate control unit ("CCU") 145 that is mounted to a rooftop 150 of the van 130. In an embodiment, the CCU 145 can be a transport refrigeration unit.

The transport climate control system 135 can include a climate control circuit that connects, for example, a compressor, a condenser, an evaporator, and an expander (e.g., an expansion valve or other expansion devices) to provide climate control within the climate controlled space 140.

The transport climate control system 135 can include a programmable climate controller 155 and one or more climate control sensors that are configured to measure one or more parameters of the transport climate control system 135 (e.g., an ambient temperature outside of the van 130, an ambient humidity outside of the van 130, a compressor suction pressure, a compressor discharge pressure, a supply air temperature of air supplied by the CCU 145 into the climate controlled space 140, a return air temperature of air returned from the climate controlled space 140 back to the CCU 145, a humidity within the climate controlled space 140, etc.) and communicate the measured parameter(s) to the climate controller 155. The one or more climate control sensors can be positioned at various locations outside the van 130 and/or inside the van 130 (including within the climate controlled space 140). In some embodiments, the transport climate control system 135 can include a microphone to directly measure a noise level generated by the transport climate control system 135.

The climate controller 155 is configured to control operation of the transport climate control system 135. The climate controller 155 may include a single integrated control unit 155 or may include a distributed network of climate controller elements 155, 157. The number of distributed control elements in a given network can depend upon the particular application of the principles of this disclosure. The measured parameters obtained by the one or more climate control sensors can be used by the climate controller 155 to control operation of the transport climate control system 135. It is appreciated that the controller 155 can be configured to control one or more operating conditions (e.g., compressor speed, fan/blower speed, or the like) of the transport climate control system 235.

One or more users (e.g., a driver, operator, passenger, or the like) can stay in a passenger compartment 190. Noise generated by the transport climate control system 135 and/or the transport unit (e.g., van 130) can be heard inside the passenger compartment 190 and affect user experience and comfort.

FIG. 1C illustrates one embodiment of the climate controlled transport unit 200 can be attached to a tractor 205. The climate controlled transport unit 200 includes a transport climate control system 210 for a transport unit 215. The tractor 205 can be attached to and be configured to tow the transport unit 215. The transport unit 215 shown in FIG. 1C is a trailer.

The transport climate control system 200 can include a climate control circuit that connects, for example, a compressor, a condenser, an evaporator, and an expander (e.g., an expansion valve or other expansion devices) to provide climate control within the climate controlled space 225.

The transport climate control system 210 includes a CCU 220. The CCU 220 is disposed on a front wall 230 of the transport unit 215. In other embodiments, it will be appreciated that the CCU 220 can be disposed, for example, on a rooftop or another wall of the transport unit 215. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate the measured parameter(s) to the climate controller 235. The one or more climate control sensors can be positioned at various locations outside the transport unit 200 and/or inside the transport unit 200 (including within the climate controlled space 225). In some embodiments, the transport climate control system 210 can include a microphone to directly measure a noise level generated by the transport climate control system 210.

The climate controller 235 is configured to control operation of the transport climate control system 210 including components of the climate control system 210. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the transport climate control system 210. It is appreciated that the controller 235 can be configured to control one or more operating conditions (e.g., compressor speed, fan/blower speed, or the like) of the transport climate control system 210.

One or more users (e.g., a driver, operator, passenger, or the like) can stay in a passenger compartment 250 in the tractor 205. Noise generated by the transport climate control system 210 and/or the transport unit (e.g., 200) can be heard inside the passenger compartment 250 and affect user experience and comfort.

FIG. 1D is a perspective view of a mass-transit vehicle 300 including a transport climate control system 305, according to one embodiment. In the embodiment illustrated in FIG. 1D, the mass-transit vehicle 300 is a mass-transit bus that can carry one or more users (not shown) to one or more destinations. A user can include a driver, pilot, operator, passenger, or the like. In other embodiments, the mass-transit vehicle 300 can be a school bus, railway vehicle, subway car, or other vehicle that can carry one or more users. Hereinafter, the term "mass-transit vehicle" shall be used to represent all such mass-transit vehicles, and should not be construed to limit the scope of the application solely to passenger buses. The transport climate control system 305 can provide climate control within a climate controlled space which in this embodiment is a passenger compartment 310.

The transport climate control system 305 includes a climate control unit ("CCU") 315 that is mounted to a rooftop 320 of the mass-transit vehicle 300. The climate control system 305 also includes a programmable climate controller 425 and one or more sensors (not shown) that are configured to measure one or more parameters of the transport climate control system 305 (e.g., an ambient temperature outside of the mass-transit vehicle 300, a controlled space temperature within the passenger compartment 310, an ambient humidity outside of the mass-transit vehicle 300, a controlled space humidity within the passenger compartment 310, etc.) and communicate the measured parameter(s) to the climate controller 325. In some embodiments, the transport climate control system 305 can include a microphone to directly measure a noise level generated by the transport climate control system 305.

The transport climate control system 305 can include, among other components, a climate control circuit (not shown) that connects, for example, a compressor, a condenser, an evaporator, and an expander (e.g., an expansion valve or other expansion devices) to provide climate control within the passenger compartment 310.

The climate controller 325 may comprise a single integrated control unit or may comprise a distributed network of climate controller elements (not shown). The number of distributed control elements in a given network can depend upon the particular application of the principles described herein. The climate controller 325 is configured to control operation of the climate control system 305 including the climate control circuit. It is appreciated that the controller 325 can be configured to control one or more operating conditions (e.g., compressor speed, fan/blower speed, or the like) of the transport climate control system 305.

One or more users (e.g., a driver, operator, passenger, or the like) can be in a passenger compartment 310. Noise generated by the transport climate control system 305 and/or the transport unit (e.g. mass-transit vehicle 300) can be heard inside the passenger compartment 310 and affect user experience and comfort.

It will be appreciated that the transport climate control systems 105, 135, 210, 305 described above with respect to FIGS. 1A-1D can operate in a plurality of operational conditions having varying capacity to affect the environmental condition(s) (e.g., temperature, humanity, etc.) within the climate controlled spaces 110, 140, 225, 310. In some embodiments, the transport climate control systems 105, 135, 210, 305 can have a variable speed compressor and one or more variable speed fans/blowers. The term "variable speed" can include operating at two or more discrete speeds (e.g., a low non-zero speed, a high non-zero speed, etc.) or continuously variable speeds that can include three or more discrete speeds to affect environmental condition(s) (e.g., temperature, humidity, atmosphere, etc.) within the climate controlled spaces 110, 140, 225, 310. In some embodiments, the transport climate control systems 105, 135, 210, 305 can include a heater, such as, as a non-limiting example, an electric heater.

In some embodiments, the TCCS can include one or more variable noise generating components (VNGC) to provide the variable climate control capacity, such as variable speed compressor, fan(s)/blower(s), pump(s) or the like. As opposed to a single speed component that can have an operating condition of on and off, VNGCs can operates at two or more different non-zero speeds. In some embodiments, the speed variation can be achieved mechanically, for example, by one or more gears converting a speed from a mover to the VNGC to different speeds. In some embodiments, variable speed is achieved by adjusting power supply, for example, by adjusting the power supply to the VNGC. In some embodiments, adjusting power supply can be adjusting an electric power supply to the VNGC. In some embodiments, the variable speed can be achieved by a combination of varying mechanical power supply to the VGNC, varying electric power supply to the VNGC, or a combination thereof. A variable noise generating component can include a compressor, one or more fan(s)/blower(s) (e.g., for the evaporator, the condenser, or the like), or the like. It will be appreciated that at least one component in the TCCS can be a variable speed component for the TCCS to provide variable climate control capacity. For example, the TCCS can include a single speed fan/blower and a variable speed compressor to provide a variable climate control capacity.

Also, the transport climate control systems 105, 135, 210, 305 shown in FIGS. 1A-1D can include a prime mover, an electric motor, or the like to drive the compressor. In some embodiments, the transport climate control systems 105, 135, 210, 305 can be powered by a power system of the vehicle (e.g., the truck 100, the van 130, the tractor 205, the mass-transit vehicle 300). In some embodiments, the transport climate control systems 105, 135, 210, 305 can include its own power system, for example including one or more of a prime mover, rechargeable energy source, a motor, a generator, an alternator, or the like.

In some embodiments, a climate controlled transport unit can generate noise during operation. The climate controlled transport unit can be in operation when the climate controlled transport unit is on and supplying power to allow the climate controlled transport unit to move even though the climate controlled transport unit may not be moving (e.g., idling). The climate controlled transport unit can also be in operation when a TCCS is providing climate control climate control within a climate controlled space (e.g., 110, 140, 225, 310). The noise can be generated by the transport unit (e.g., 100, 130, 205, 300), and/or the TCCS (e.g., 105, 135, 210, 305), and/or ambient conditions outside of the TCCS (e.g., wind, road noise, etc.). The amount of noise generated by the TCCS (e.g., 105, 135, 210, 305) can be controlled using, for example, the method 400 shown in FIG. 2 described in more detail below.

In some embodiments, the level of noise generated by the transport unit ("TU noise") can correlate with its traveling speed. For example, when the climate controlled transport unit is traveling at a particular speed, noise can be generated by the wind and/or components on the TU and/or the TCCS, such as tire noise, engine noise, motor noise, road noise, fan/blower noise, or the like. In some embodiments, TU noise can be higher at a higher traveling speed and lower at a lower traveling speed.

In some embodiments, the level of noise generated by the transport climate control system ("TCCS noise") can correlate with the climate control capacity provided by the TCCS. For example, when the TCCS is providing a particular climate control capacity, a particular noise level can be generated by the compressor and/or the fan(s)/blower(s) operating at a particular speed or the like. It will be appreciated that a discretely controlled TCCS can operate the compressor and/or fan(s)/blower(s) at two or more discrete speeds such that the TCCS noise can be have multiple discrete levels. It will be appreciated that a continuously variable TCCS can provide climate control capacity within a continuous range of discrete speeds. Accordingly, TCCS noise can be higher when providing a larger climate capacity and lower when providing a lower climate control capacity.

Noise can be quantified by a noise level that represent a value that can, for example, be used by the controller (e.g., 125). In some embodiments, the noise level can be a numerical value. In some embodiments, the noise level can correlate with the user's perception of noise generated by e.g., the TCCS, the TU, or the like, or any combination thereof. The noise level can correlate with, but not limited to, the noise intensity (e.g., loudness), the noise quality (e.g., sound frequency or tone), or the like, or any combination thereof. In some embodiments, the noise level can correlate with sound pressure level, sound power level, for example, measured by a decibel meter, a microphone, etc. In some embodiments, the noise level can be the result of a function of noise intensity, noise quality, sound pressure level, sound power level, etc. For example, the noise level can be an intensity of noise in decibel (i.e., noise level being a function of noise intensity) and/or a frequency of noise in hertz (i.e., noise level being a function of noise frequency). In some embodiments, the noise level can be a function of both intensity and frequency. In some embodiments, the noise level can be a function of intensity, frequency, sound pressure level, sound power level, and/or the like. In some embodiments, the noise level can further include other variables that affect a user perception of the noise produced by the TCCS noise. Other variables can include variability over a period of time, any sound dampening materials or equipment, environmental noise, or the like. In some embodiments, the noise level can a normalized value scaled to in a range of 0-1, 1-10, 1-100, or the like, with or without any physical units.

It is appreciated that the noise level generated by the TCCS can be, but is not required to be, proportional to the operating condition or the climate control capacity output. For example, noise intensity can be lower at a certain operating condition due to, for example, design optimization by the manufacture. For example, the noise intensity generated by the compressor can be the lower at 600 rpm, but higher at 400 and 800 rpm. It is further appreciated that that noise frequency can be lower at a certain operating condition due to, for example, design optimization by the manufacture. For example, the noise frequency generated by the compressor can be the lower at 600 rpm, and higher at both 400 and 800 rpm.

It is further appreciated that noise level can be skewed by certain noise intensity/frequency or intensity/frequency ranges. For example, noise at a certain range of frequency can be more distractive than a noise at a frequency above or below the range of frequency. Accordingly, at the same noise intensity, the noise level of a higher frequency noise may be lower than the noise level of a lower frequency noise. Similarly, the certain range of intensity of noise can be more distractive than a noise intensity above or below the certain range of intensity. Accordingly, at the same noise frequency, the noise level of a higher intensity noise may be lower than the noise level of a lower intensity noise.

Figure 2:
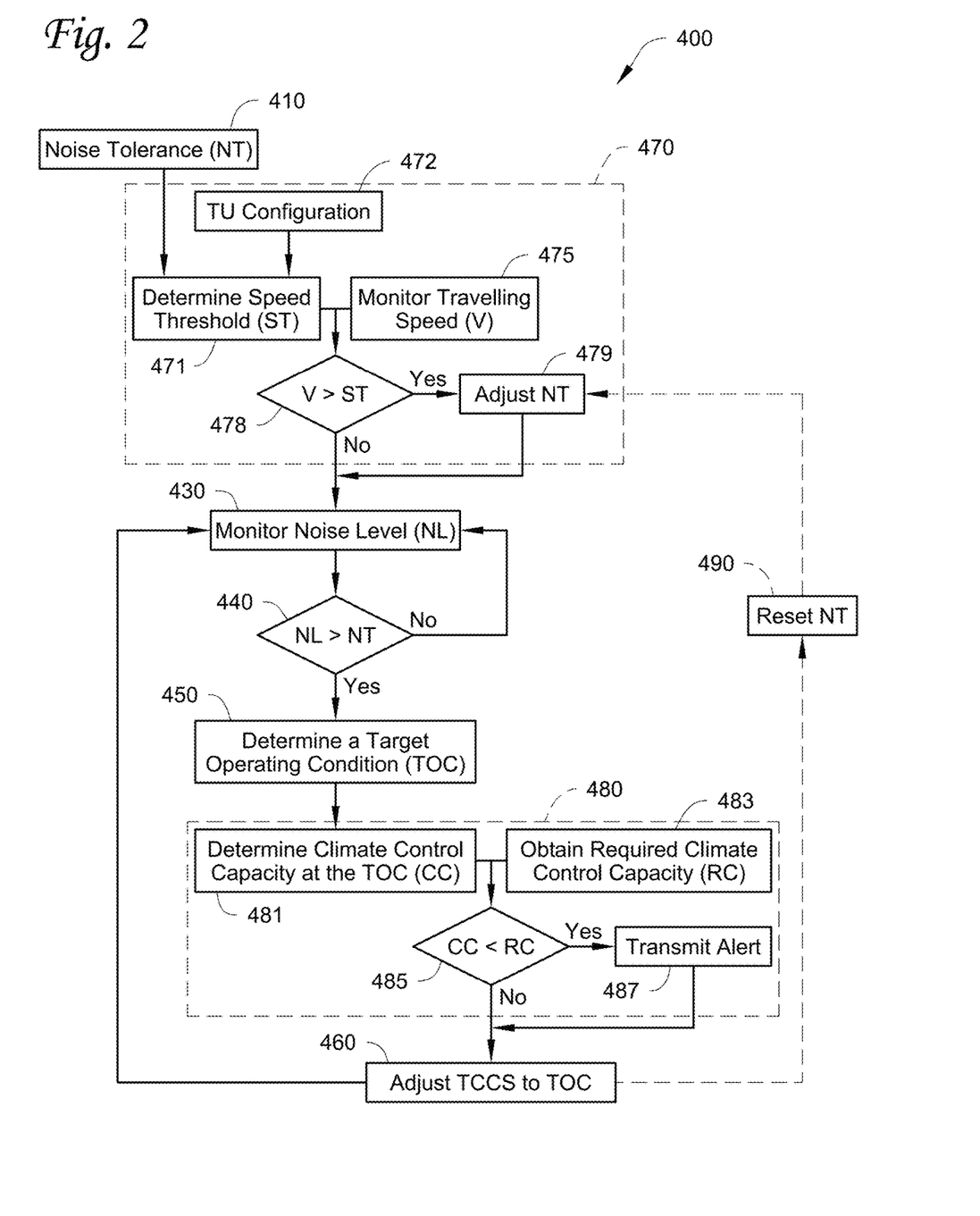
FIG. 2 is a flow chart of a method for controlling noise generated by a TCCS, according to an embodiment.

FIG. 2 shows a flow chart of a method 400 for controlling noise of a TCCS, according to an embodiment. That is, the method 400 can control a noise level of a TCCS (e.g., the TCCSs 105, 135, 210, 305 described above with respect to FIGS. 1A-1D). The TCCS can include a climate control circuit and a controller (e.g., the controllers 125, 155, 235, 325 described above with respect to FIGS. 1A-1D) configured to control the climate control circuit to condition a climate controlled space (e.g., the climate controlled spaces 110, 140, 225, 310 described above with respect to FIGS. 1A-1D) in a TU (e.g., the truck 100, the van 130, the TU 200, the mass-transit vehicle 300 described above with respect to FIGS. 1A-1D). The climate control circuit can include, for example, a compressor, a condenser, an expander (e.g., expansion valve), and an evaporator fluidly connected by the climate control circuit. The condenser and/or the evaporator can each include one or more fans/blowers that assist heat transfer of the condenser and/or the evaporator.

The method 400 begins at 410 whereby a controller obtains a user's desired noise tolerance NT generated by at least the TCCS. That is, the noise tolerance NT can be a threshold noise level that includes at least the TCCS noise. In some embodiments, the noise tolerance NT can be a threshold noise level that includes at least TCCS noise and the TU noise. In some embodiments, the noise tolerance NT can be a maximum noise level desirable or allowed, for example, by the user, local or remote operator, passenger, government regulation, or the like.

The controller can obtain the noise tolerance NT from a user input directly or indirectly to a human-machine interface (HMI) of the controller. A user of the TU and/or the TCCS, a remote operator (e.g., a fleet manager), or the like can enter the noise level into the controller over the internet or locally with an input device, such as a computer configured to communicate with the controller, or the like. In some embodiments, the noise tolerance NT is obtained through a user input of the HMI, such as a nob, a button, a virtual nob/button on a screen, or the like. The HMI can be part of, or communicate with, a telematics system on the climate controlled transport unit that includes the TU and/or the TCCS. In some embodiments, the noise tolerance NT can be a profile of noise tolerance NT such that the noise tolerance NT obtained by the controller can vary based on, for example, traveling speed, time of day, geo fence, operator preference, accumulative noise level over a period of time, or the like.

The TCCS noise can include noise generated by, for example, one or more compressors, fans/blowers, pumps, and/or the like, to provide climate control within a climate controlled space (e.g., the climate controlled spaces 110, 140, 225, 310 described above with respect to FIGS. 1A-1D). In some embodiments, the noise level generated by the TCCS can correlate with the climate control capacity provided by the TCCS at an operating condition of the TCCS. In some embodiments, the noise level generated by the TCCS can include other TCCS noise during operating, for example, rattling noise from the movement of the TCCS, audio notifications or alarms, and other sounds generated by the TCCS that can be perceptible by a passenger in the TU. The method 400 then proceeds to 430 or optional 470.

At 430, the controller monitors the noise level generated by the climate controlled transport system (NL). In some embodiments, the noise level NL can include the noise level generated by the TU ("TU noise"), the noise level generated by the TCCS ("TCCS noise"), the baseline noise level, a combination thereof, or the like. The baseline noise level can include any noise generated separately from the noise generated by the TCCS to provide climate control within the climate controlled space. In some embodiments, a baseline noise level can include the noise generated by the transport unit. In some embodiments, a baseline noise level can be the noise generated by the climate controlled transport unit that is correlated with the traveling speed of the climate controlled transport unit, the transport unit, and/or the transport climate control system. In some embodiments, the controller can determine the baseline noise level via a sensor reading (e.g., a microphone). In some embodiments, the controller can estimate the baseline noise based on the TU configuration alone or in combination with various parameters (e.g., a traveling speed of the TU, weather where the TU is currently located, etc.). In some embodiments, an accelerometer, gyroscope, or the like, can provide (or be incorporated with the GPS location data to determine) the acceleration and/or the traveling speed of the TU, which can be incorporated into the determination of the baseline noise level.

In some embodiments, the controller can monitor TCCS noise via a sensor reading (e.g., a microphone). In some embodiments, the controller can monitor the noise level constantly or at predetermined time intervals. In some embodiments, the controller can obtain a noise level reading directly from a sensor. In other embodiments, the controller can obtain other sensor readings that can be used to calculate the noise level. For example, a controller stored dynamic model can be used to predict a sound generated by the TCCS based on various parameters (e.g., temperature within a climate controlled space, an ambient temperature outside of the transport unit, a condenser fan(s)/blower(s) speed, an evaporator fan(s)/blower(s) speed, a compressor speed, etc.). In some embodiments, the dynamic model can estimate the sound generated by the TCCS based on a compressor speed and/or fan/blower speed. In some embodiments, an accelerometer, gyroscope, or the like, can provide (or be incorporated with the GPS location data to determine) the acceleration and/or the traveling speed of the TCCS, which can be incorporated into the determination of the noise level of the TCCS. The method 400 then proceeds from 430 to 440.

At 440, the controller compares the noise tolerance NT with the noise level. When the controller determines that the noise level is greater than or equal to the noise tolerance NT, the method 400 proceeds to 450. When the noise level is less than the noise tolerance NT, the method 400 returns to 430.

At 450, the controller determines a target operating condition (TOC) of the TCCS. The TOC of the TCCS can be one or more operating conditions that can be adjusted to achieve a target noise level. An operating condition of the TCCS can include controlling a compressor at a particular compressor speed, a fan/blower for the condenser operating at a particular condenser fan/blower speed, a fan/blower for the evaporator operating at a particular evaporator fan/blower speed, or the like. The target noise level can be the TCCS noise that matches the noise tolerance. In some embodiments, matching the noise tolerance can be a noise level being the same as the noise level of the noise tolerance. In other embodiments, matching the noise tolerance can be a noise level being within a predetermined range above or below the noise level of the noise tolerance. The predetermined range can be predetermined by a user (e.g., a driver, a remote operator, etc.) Operating conditions can be mapped with different noise levels. For example, the operating condition of a compressor operating at a first compressor speed and a fan/blower for the condenser operating at a first condenser fan/blower speed can produce a first climate control capacity and generate a first noise level. In some embodiments, the TOC can be determined based on the target noise level or at a noise level below the noise tolerance. The method 400 then proceeds to 460 or optional 480.

It is appreciated that the noise tolerance used to determine TOC at 450 may or may not has the same threshold noise level as the noise tolerance obtained at 410. For example, the noise tolerance used to determine TOC at 450 can be adjusted at 479 as further discussed below with respect to the optional speed threshold test 470.

At 460, the controller adjusts operation of the TCCS based on the TOC obtained at 450. By adjusting operation of the TCCS based on the TOC, the noise level generated by the TCCS can be controlled. For example, the controller can reduce the TCCS noise to be the same or lower than the TU noise, the baseline noise level, a combination thereof, or the like. In some embodiments, the TCCS noise at the TOC can be lower than the noise tolerance NT so that the combined noise level of the TU noise and the TCCS noise can be at or below the noise tolerance NT. By reducing or controlling the TCCS noise, a combined noise level from the TU and the TCCS can be reduced. In some embodiments, by controlling the TCCS noise according to the TOC, the TCCS noise can be adjusted to a lower noise level that can be masked by the TU noise such that the user can be less distracted or annoyed by the TCCS noise.

One or more TOCs can map to one or more noise levels monitored at 450. By adjusting the TCCS to a TOC correlated with a target noise level, the noise level of the TCCS can be adjusted to the target noise level, controlling the TCCS noise. The TOC can include one or more target operating conditions of the compressor(s), fan(s), blower(s), pump(s), or the like, of the TCCS. The operating condition can include one or more compressor speed, fan/blower speed, pump output, or the like. Thus, the method 400 can improve user experience and comfort by controlling noise via adjusting, for example, the compressor speed and/or fan speed based on the noise tolerance NT.

In some embodiments, the method 400 proceeds to 430 or optional 490. In some embodiments, the method 400 proceeds to 490 when the method 400 proceeds from 410 to optional 470.

The method 400 can optionally include a speed threshold (ST) test at 470. In some embodiments, the optional speed threshold test 470 can compare a traveling speed of the climate controlled transport unit with the speed threshold so that, when a baseline noise level exceeds the noise tolerance NT, the noise tolerance NT can be adjusted, for example, to match the baseline noise level created at the traveling speed.

In some embodiments, the noise tolerance NT can be adjusted to a higher noise level threshold to allow the TCCS to increase its climate control capacity. For example, at a high traveling speed, the baseline noise level can be already above the noise tolerance NT obtained at 410 with or without the noise from the TCCS. The high traveling speed can be a traveling speed above or equal to the speed threshold determined at 471. Accordingly, even if increasing the TCCS noise to be above the noise tolerance NT obtained 410 (but below the baseline noise level), the TCCS noise can still be masked by the baseline noise. Thus, adjusting the noise tolerance NT to a higher noise level threshold can allow the TCCS to generate a higher climate control capacity to provide more flexibility when providing climate control within the climate controlled space (e.g., the climate controlled space 110, 140, 225, 310 shown in FIGS. 1A-1D) without sacrificing user experience with respect to noises.

The optional speed threshold test 470 begins at 472, whereby the controller obtains a transport unit configuration ("TU configuration") at 472. In some embodiments, the transport unit configuration can be used to determine the speed threshold at 471, monitor noise level at 430, or the like. The transport unit configuration can include, for example, the make, type, and/or model of the TU and other parameters or inputs that can be mapped to determine a speed threshold, the baseline noise level, or the like.

For example, transport units having different TU configurations can correlate with produce different levels of baseline noise, for example, due to different TUs producing different levels of road noise at different speeds. Accordingly, different TU configurations can be mapped to different algorithm(s) configured determine the speed threshold, the baseline noise level, the TOC, or the like, for different TUs. The transport unit make can include, for example, the name of the manufacture, the make and/or model of the transport unit, etc. The transport unit type can represent the type of components presented in the climate controlled transport unit. For example, transport unit types can be a truck, a van, a container, a mass-transit vehicle, or the like. The transport unit model can be a model number or model name that determines components configuration. Component configurations can include make and model of the compressor, the fan/blower, the pump, or the like. The TU configures(s) can be used to as additional inputs to refine the correlation between the traveling speed, TCCS operating conditions(s), the TCCS noise, and/or the like. For example, the geometry, material, and assembly of the TCCS and/or the TU that can refine the correlations for determining, for example, the wind noise, tire noise of the climate control transport unit with the traveling speed. By incorporating the TU configuration, the controller can determine a more accurate speed threshold, TCCS noise, TOC, or the like.

At 471, the controller determines a speed threshold based on the noise tolerance NT obtained at 410 and/or the TU configuration obtained at 472. The speed threshold can be a maximum traveling speed at which a baseline noise level exceeds the noise tolerance NT (e.g., obtained at 410). The speed threshold can be an output determined by one or more algorithms mapping a plurality of noise tolerances to a plurality of traveling speeds based on different TU configurations. In some embodiments, the controller can determine the speed threshold based on additional factors, such as a user input that allows the speed threshold to deviate from factory/fleet controller settings, weather conditions, government regulations, etc. For example, the additional factors can be additional inputs to the one or more algorithm to refine the output threshold speed. For example, a user input can adjust the threshold speed output to be, for example, 10% below the determined speed threshold, so that the TCCS can generate more noise and higher conditioning capacity at a lower speed than the determined speed threshold. In some embodiments, the controller can determine a maximum speed at which the climate controlled transport unit can have before the baseline noise level reaches the noise tolerance NT obtained at 410. It will be appreciated that the baseline noise level can be generally correlated with a traveling speed of the climate controlled transport unit. In some embodiments, the controller can correlate the noise tolerance NT to a baseline noise level to determine a speed at which the climate control transport unit makes a baseline noise level that is equal to the noise tolerance obtained at 410. This speed is used by the controller as the speed threshold. In some embodiment, the controller can determine the threshold speed as an output based on the TU configuration as an additional input. For example, a TU being a truck made by a certain manufacture can have a particular noise profile with respect to traveling speed. The controller can use the TU configuration as an input, or to select the algorithm for the particular truck, to estimate the speed threshold for this particular truck based on the input noise tolerance.

At 475, the controller monitors a traveling speed of the climate controlled transport unit, the TCCS, the TU, or the like. The traveling speed can be determined from the controller that determine the traveling speed using location data.

The location data can be obtained from the TCCS, the TU, or the like. In some embodiments, the location data can be obtained from GPS location data provided by a GPS module of the TCCS, and/or the TU. The controller can monitor the traveling speed by, for example, reading or determining the traveling speed (e.g., based on the GPS module) continuously or at predetermined intervals of time, receiving the traveling speed from a vehicle and/or the TU, or other parameters that can be used to determine the traveling speed, etc.

At 478, the optional speed threshold test 470 proceeds to compare the speed threshold determined at 471 with the traveling speed determined at 475. When the controller determines that the traveling speed is greater than or equal to the speed threshold, the speed test 470 proceeds to 479. When the controller determines that the traveling speed is less than the speed threshold, the speed test 470 is complete and the method 400 proceeds to 430.

At 479, the controller adjusts the noise tolerance NT obtained at 410 to match the noise level generated by the transport unit so that the controller can allow the TCCS to generate a higher climate control capacity than the maximum capacity allowable with the noise tolerance NT obtained at 410.

In some embodiments, the noise tolerance can be adjusted at 479 to match the baseline noise level so that the increase of TCCS noise can be masked by the baseline noise. In some embodiments, the noise tolerance NT can be adjusted according to the baseline noise level. For example, the controller can adjust the noise tolerance NT to match the baseline noise level. It is appreciated that matching the baseline noise level can include the noise tolerance NT having a same or similar noise level as the baseline noise level. A similar noise level can include a range above or below the baseline noise level (e.g., 1%, 2%, 5%, 10%, or the like, above or below the baseline noise level).

By increasing the TCCS noise but keeping it below other noises from the climate controlled transport system (e.g., the TU noise or baseline noise), an increase in the TCCS noise can be masked by the other noises, unnoticeable by the user. In some embodiments, when a baseline noise generated by the climate controlled transport unit exceeds the noise tolerance NT, the noise tolerance NT can be increased allowing the TCCS to generate a larger climate control capacity. In some embodiments, the adjusted noise tolerance NT determined at 479 can be used in the comparison at 440, and to determine the TOC at 450.

In some embodiments, the method 400 can optionally include an optional capacity check 480. The optional capacity check 480 can allow, for example, the controller to transmit an alert when the TOC determined at 450 produces a climate control capacity below a climate control capacity required by the TCCS to maintain a desired climate within the climate controlled space (RC).

The optional capacity check 480 begins at 481 whereby the controller determines a climate control capacity at the TOC determined at 450.

The optional capacity check 480 also begins at 483 whereby the controller obtains the RC to maintain a desired climate within the climate controlled space. The RC can be determined, for example, based on a desired climate setpoint (e.g., temperature setpoint) within the conditioned space and monitored climate data (e.g., monitored temperature data) within the climate controlled space. The monitored climate data can be obtained from a climate sensor (e.g., temperature sensor) disposed within the climate controlled space. In some embodiments, the RC can include an input from another controller or input, for example, by a local or remote operator, by the telematics system through a communication protocol between the TU and the TCCS, or the like.

When the controller determines the climate control capacity at the TOC (CC) at 481 and the controller obtains the required climate control capacity RC at 483, the optional capacity check 480 proceeds to 485.

At 485, the controller compares the climate control capacity at TOC (CC) and the required climate control capacity (RC) 485. When the controller determines that the CC is less than the RC, the optional capacity check 480 proceeds to 487. When the controller determines that the CC is greater than or equal to the RC, the optional capacity check 480 proceeds to 460.

At 487, the controller transmits an alert signaling that the TCCS may not be able to maintain the desired climate within the climate controlled space. The alert can be transmitted to the local or remote operator, another controller, or the like. The optional capacity check 480 then proceeds to 460.

At optional 490, the noise tolerance NT is adjusted to reset the noise tolerance NT to the noise tolerance obtained at 410. In the illustrated example, optional 490 occurs after adjusting TCCS according to TOC at 460 and before returning the method 400 back to optional 470. In some embodiments, the noise threshold NT can also be reset at 490, for example, after a set period of time, when triggered by a threshold traveling speed of the climate controlled transport unit, etc.

Aspects. It is noted that any one of aspects 1-10 can be combined with any one of aspects 11-20.

Aspect 1. A method for controlling noise generated by a transport climate control system (TCCS) that provides climate control within a climate controlled space of a transport unit, the method comprising:
a controller obtaining a noise tolerance, wherein the noise tolerance is a threshold noise level that includes at least a noise level generated by the TCCS;
the controller monitoring the noise level generated by the TCCS;
the controller comparing the noise tolerance with the noise level generated by the TCCS;
upon the controller determining that the noise level generated by the TCCS is greater than the noise tolerance, the controller determining a target operating condition of the TCCS for matching the noise level generated by the TCCS with the noise tolerance; and
the controller adjusting the TCCS to the target operating condition to adjust the noise level generated by the TCCS.

Aspect 2. The method of aspect 1, further comprising the controller monitoring the noise level generated by the TCCS by monitoring a traveling speed of the transport unit.

Aspect 3. The method of aspect 2, further comprising the controller monitoring the traveling speed by:
obtaining location data of the transport unit, and
determining the traveling speed based on the location data of the transport unit.

Aspect 4. The method of any one of aspect 1-3, wherein the controller adjusting the TCCS includes adjusting a speed of a compressor of the TCCS.

Aspect 5. The method of any one of aspect 1-4, further comprising the controller obtaining a transfer unit (TU) configuration.

Aspect 6. The method of aspect 5, further comprising the controller monitoring the noise level generated by the TCCS based on the TU configuration.

Aspect 7. The method of any one of aspect 1-6, further comprising the controller determining a speed threshold based on the noise tolerance such that the speed threshold is a maximum traveling speed at which a baseline noise level exceeds the noise tolerance.

Aspect 8. The method of any one of aspect 1-7, further comprising, upon the controller determining that the traveling speed is greater than the speed threshold, the controller adjusting the noise tolerance to the baseline noise level.

Aspect 9. The method of any one of aspect 1-8, further comprising
- the controller obtaining a required climate control capacity;
- the controller determining a climate control capacity based on the target operation condition of the TCCS;
- the controller determining that the required climate control capacity is greater than the climate control capacity at the target operating condition; and
- the controller transmitting an alert upon determining that the required climate control capacity is greater than the climate control capacity at the target operating condition.

Aspect 10. The method of any one of aspects 1-9, further comprising the controller resetting the noise tolerance after adjusting the TCCS to the target operating condition.

Aspect 11. A transport climate control system (TCCS) for providing climate control within a climate controlled space of a transport unit, the TCCS comprising:
- a climate control circuit configured to provide climate control within the climate controlled space; and
- a controller configured to control the climate control circuit, wherein the controller is also configured to:
  - obtain a noise tolerance, wherein the noise tolerance is a threshold noise level that includes at least a noise level generated by the TCCS;
  - monitor the noise level generated by the TCCS;
  - compare the noise tolerance with the noise level generated by the TCCS;
  - upon determining that the noise level generated by the TCCS is greater than the noise tolerance, determine a target operating condition of the TCCS for matching the noise level generated by the TCCS with the noise tolerance; and
  - adjust the TCCS to the target operating condition to adjust the noise level generated by the TCCS.

Aspect 12. The TCCS of aspect 11, wherein the controller is configured to monitor the noise level generated by the TCCS by monitoring a traveling speed of the transport unit.

Aspect 13. The TCCS of aspect 12, wherein the controller is configured to monitor the traveling speed by:
- obtaining location data of the transport unit, and
- determining the traveling speed based on the location data of the transport unit.

Aspect 14. The TCCS of any one of aspect 11-13, wherein the controller being configured to adjust the TCCS to the target operating condition includes the controller being configured to adjust a speed of a compressor of the TCCS.

Aspect 15. The TCCS of aspect 14, wherein the controller is configured to obtain a transfer unit (TU) configuration.

Aspect 16. The TCCS of aspect 15, wherein the controller is configured to monitor the noise level generated by the TCCS based on the TU configuration.

Aspect 17. The TCCS of any one of aspect 11-16, wherein the controller is configured to determine a speed threshold based on the noise tolerance such that the speed threshold is a maximum traveling speed at which a baseline noise level exceeds the noise tolerance.

Aspect 18. The TCCS of any one of aspect 11-17, wherein the controller is configured to, upon determining that the traveling speed is greater than the speed threshold, adjust the noise tolerance to the baseline noise level.

Aspect 19. The TCCS of any one of aspect 11-18, wherein the controller is configured to:
- obtain a required climate control capacity;
- determine a climate control capacity based on the target operation condition of the TCCS;
- compare the required climate control capacity with the climate control capacity at the target operating condition; and
- transmit an alert when the required climate control capacity is greater than the climate control capacity at the target operating condition.

Aspect 20. The TCCS of any one of aspects 11-19, wherein the controller is configured to reset the noise tolerance after adjusting the TCCS to the target operating condition.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

We claim:

1. A method for controlling noise generated by a transport climate control system (TCCS) that provides climate control within a climate controlled space of a transport unit, the method comprising:
   a controller obtaining a noise tolerance, wherein the noise tolerance is a threshold noise level that includes at least a noise level generated by the TCCS;
   the controller monitoring the noise level generated by the TCCS;
   the controller comparing the noise tolerance with the noise level generated by the TCCS;
   upon the controller determining that the noise level generated by the TCCS is greater than the noise tolerance, the controller determining a target operating condition of the TCCS for matching the noise level generated by the TCCS with the noise tolerance; and
   the controller adjusting the TCCS to the target operating condition to adjust the noise level generated by the TCCS.

2. The method of claim 1, further comprising the controller monitoring the noise level generated by the TCCS by monitoring a traveling speed of the transport unit.

3. The method of claim 2, further comprising the controller monitoring the traveling speed by:
   obtaining location data of the transport unit, and
   determining the traveling speed based on the location data of the transport unit.

4. The method of claim 1, wherein the controller adjusting the TCCS includes adjusting a speed of a compressor of the TCCS.

5. The method of claim 1, further comprising:
   the controller obtaining a transport unit (TU) configuration, and
   the controller monitoring the noise level generated by the TCCS based on the TU configuration.

6. The method of claim 1, further comprising:
   the controller determining a speed threshold based on the noise tolerance such that the speed threshold is a maximum traveling speed at which a baseline noise level exceeds the noise tolerance, and
   upon the controller determining that the traveling speed is greater than the speed threshold, the controller adjusting the noise tolerance to the baseline noise level.

7. The method of claim 1, further comprising:
   the controller obtaining a required climate control capacity;
   the controller determining a climate control capacity based on the target operation condition of the TCCS;
   the controller determining that the required climate control capacity is greater than the climate control capacity at the target operating condition; and
   the controller transmitting an alert upon determining that the required climate control capacity is greater than the climate control capacity at the target operating condition.

8. The method of claim 1, further comprising:
   the controller resetting the noise tolerance after adjusting the TCCS to the target operating condition.

9. A transport climate control system (TCCS) for providing climate control within a climate controlled space of a transport unit, the TCCS comprising:
   a climate control circuit configured to provide climate control within the climate controlled space; and
   a controller configured to:
      control the climate control circuit;
      obtain a noise tolerance, wherein the noise tolerance is a threshold noise level that includes at least a noise level generated by the TCCS;
      monitor the noise level generated by the TCCS;
      compare the noise tolerance with the noise level generated by the TCCS;
      upon determining that the noise level generated by the TCCS is greater than the noise tolerance, determine a target operating condition of the TCCS for matching the noise level generated by the TCCS with the noise tolerance; and
      adjust the TCCS to the target operating condition to adjust the noise level generated by the TCCS.

10. The TCCS of claim 9, wherein the controller is configured to monitor the noise level generated by the TCCS by monitoring a traveling speed of the transport unit.

11. The TCCS of claim 9, wherein the controller being configured to adjust the TCCS to the target operating condition includes the controller being configured to adjust a speed of a compressor of the TCCS.

12. The TCCS of claim 9, wherein the controller is configured to:
   obtain a transport unit (TU) configuration, and
   monitor the noise level generated by the TCCS based on the TU configuration.

13. The TCCS of claim 9, wherein the controller is further configured to:
   determine a speed threshold based on the noise tolerance such that the speed threshold is a maximum traveling speed at which a baseline noise level exceeds the noise tolerance, and
   upon determining that the traveling speed is greater than the speed threshold, adjust the noise tolerance to the baseline noise level.

14. The TCCS of claim 9, wherein the controller is further configured to:
   obtain a required climate control capacity;
   determine a climate control capacity based on the target operation condition of the TCCS;
   compare the required climate control capacity with the climate control capacity at the target operating condition; and
   transmit an alert when the required climate control capacity is greater than the climate control capacity at the target operating condition.

15. The TCCS of claim 9, wherein the controller is further configured to reset the noise tolerance after adjusting the TCCS to the target operating condition.

* * * * *